G. R. BECKWITH & J. W. BACON.
COUCH AND BED SPRING EQUALIZER.
APPLICATION FILED DEC. 23, 1908.

978,105.

Patented Dec. 6, 1910.

WITNESSES
M W Walstrom
J A Byington

INVENTORS
GROVE R. BECKWITH
JEREMIAH W. BACON
BY Paul & Paul
THEIR ATTORNEYS

UNITED STATES PATENT OFFICE.

GROVE R. BECKWITH AND JEREMIAH W. BACON, OF MINNEAPOLIS, MINNESOTA, ASSIGNORS TO SELF EQUALIZER BED COMPANY, OF MINNEAPOLIS, MINNESOTA, A CORPORATION OF MINNESOTA.

COUCH AND BED SPRING EQUALIZER.

978,105.  Specification of Letters Patent.  Patented Dec. 6, 1910.

Application filed December 23, 1908. Serial No. 468,992.

*To all whom it may concern:*

Be it known that we, GROVE R. BECKWITH and JEREMIAH W. BACON, both of Minneapolis, Hennepin county, Minnesota, have invented certain new and useful Improvements in Couch and Bed Spring Equalizers, of which the following is a specification.

The object of our invention is to provide a simple attachment for a couch, divan or bed spring to equalize or distribute the load on the springs, eliminating the objectionable sagging frequently incidental to springs of this kind when sitting or lying on them.

Couches, as usually constructed, will, in a short time, sag under the weight of the person and settle down to the rails of the couch. Bed springs will sag in the center, allowing the mattress to settle and form a most uncomfortable resting place.

With our invention, the objectionable features are obviated, for when a load is applied to any portion of the springs, it will be equally distributed over all of them, resulting in a uniform depression and positively prevent sagging in any one place.

Our invention consists generally in means for distributing the load equally upon the springs of a couch, divan or bed.

Figure 2:
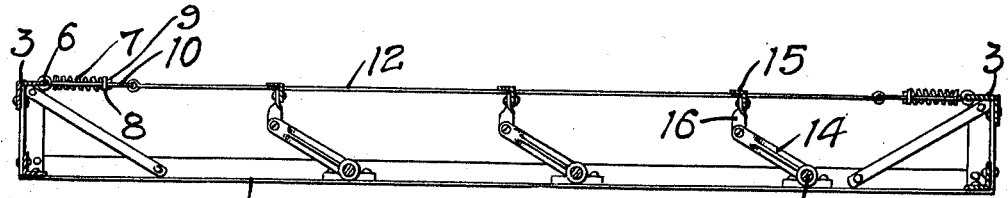
Figure 1:
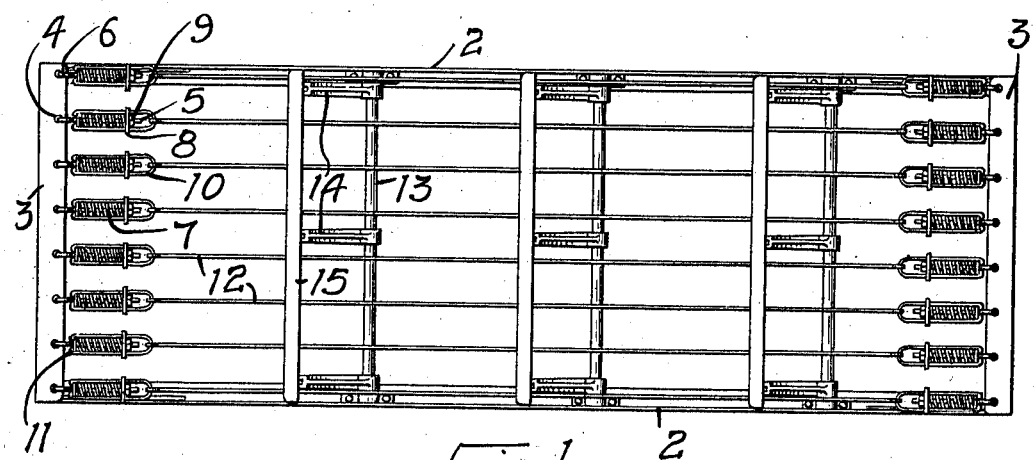
Figure 3:
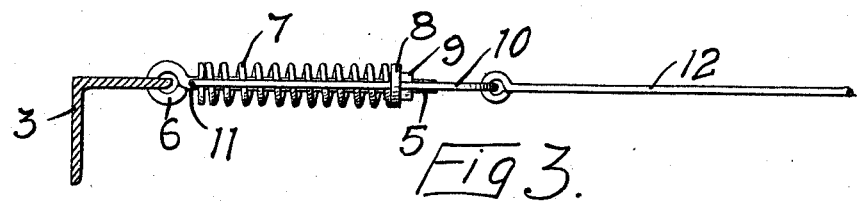
Figure 4:
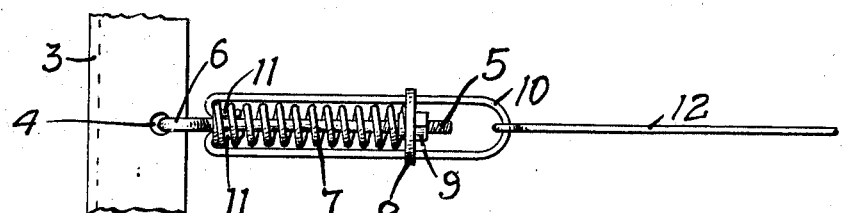

In the accompanying drawings, forming part of this specification, Figure 1 is a plan view, illustrating the application of our invention to a couch frame, Fig. 2 is a longitudinal, sectional view of the same, Figs. 3 and 4 are detail views of the spring members provided at the ends of the couch.

In the drawing, 2 and 3 represent the side and end rails of a couch, preferably made of angle bars on account of their strength and rigidity, in proportion to their weight, although other material may be employed, if preferred. The horizontal flanges of the end rails have holes 4 therein to which bolts 5 are connected by means of loops 6. These bolts are provided with coil springs 7 and with washers 8 adjustable thereon by means of lock nuts 9. Guides 10, preferably of wire, have their ends 11 inwardly turned and engaging the outer end loops of the springs 7, the opposite ends of the springs contacting with the washers 8. The guides project beyond the washers and the lock nuts on the bolts and are connected to wires 12, which extend lengthwise of the couch frame parallel with one another and are connected at their opposite ends to similar spring devices attached in a similar way to the rail at that end. The tension of the springs 7 can be regulated by adjustment of the lock nuts 9 and it is evident that when pressure is applied to the wires 12, the springs 7 will be put under compression for the purpose of yieldingly supporting the load. To insure the even distribution of the load on the wires, we provide one or more shafts 13, mounted in bearings on the side rails 2 and having a series of arms 14. We have shown three of these shafts in the drawings, but a greater or less number may be employed, if preferred. Upon the wires we arrange transverse bars 15, also of angle form, although any other shape may be employed and connect these bars at each end and the middle by links 16 with the ends of the arms 14. When therefore, pressure is applied to one or more of the wires and springs, it will be transmitted through the transverse bars 15 across the bed and the springs will be put under tension equally and a uniform level maintained across the surface of the couch, bed or other article of furniture, to which the invention may be applied. In this way, unequal strain on the springs is avoided and the load is evenly distributed across the entire surface of the springs.

We claim as our invention:—

1. The combination, with a frame and a spring surface thereon, of arms supported on said frame, an equalizer arranged above said spring surface and links pivotally connecting said arms with said equalizer.

2. The combination, with a frame, of a spring surface mounted thereon, an equalizer bar extending transversely of said surface, arms having pivotal supports on said frame on each side thereof, and links pivotally connecting said arms with the ends of said bar, substantially as described.

3. An equalizer for bed springs, couches and the like, comprising bars extending transversely with respect to the longitudinal axis of the springs and adapted to equally distribute the load thereon, shafts journaled beneath said springs, arms mounted on said shafts and having pivotal connections with said bars, and said arms being normally inclined with respect to the plane of said springs.

4. An equalizer for bed springs, couches and the like, comprising a spring surface, an equalizer arranged above the same, arms pivotally supported beneath said equalizer and links pivotally connecting said arms with said equalizer, for the purpose specified.

5. A spring surface for beds, couches and the like having non-yielding middle portions and yielding end portions attached to said middle portions at one end and having fixed connections at their other end, and an equalizer bar arranged to bear on said non-yielding portions, said bar resting freely on the top of said non-yielding portions and distributing the load evenly thereon.

6. An equalizer for bed springs, couches and the like, comprising a rock shaft having bearings at its ends, arms secured on said rock shaft at the ends and near the middle thereof and inclined upwardly therefrom, a yielding spring surface, a bar resting transversely thereon, and links pivotally connecting said bar with said arms, whereby when pressure is applied to any portion of said bar, the remaining portion will be simultaneously depressed therewith, substantially as described.

7. The combination, with a frame, of a spring surface having non-yielding middle portions and yielding end portions, a series of rock shafts journaled in said frame transversely thereof beneath said yielding surface, arms secured on said rock shafts and projecting upwardly therefrom, bars adapted to rest on the non-yielding portion of said surface and extending across the same, and links pivotally connecting said bars with said arms, substantially as described.

8. The combination, with a frame having side and end rails, said end rails being raised above the level of said side rails, a series of coil springs attached to said end rails and adapted to yield when tension is applied thereto, a series of wires connecting the coil spring of one end rail with the corresponding coil spring of the opposite end rail, and an equalizing bar resting upon said wires and extending transversely thereof from side to side and having means pivotally supporting it, substantially as described.

9. The combination, with a frame having a spring surface, of an equalizer extending transversely of said surface and arranged above the same, arms having pivotal supports on said frame on each side thereof and links pivotally connecting said arms with said equalizer.

10. An equalizer for bed springs, couches and the like, comprising a rock shaft, arms mounted on said shaft, a yielding spring surface, an equalizer arranged above the same, links pivotally connecting said arms with said equalizer, whereby when pressure is applied to any portion of said equalizer the remaining portion will be simultaneously depressed.

11. The combination, with a frame and a spring surface, of a series of rock shafts journaled in said frame, arms secured on said rock shafts, an equalizing device arranged above said spring surface and extending transversely of the same and links connecting said equalizing device with said arms.

In witness whereof, we have hereunto set our hands this 15th day of December 1908.

GROVE R. BECKWITH.
JEREMIAH W. BACON.

Witnesses:
RICHARD PAUL,
C. G. HANSON.